(12) United States Patent
Kim et al.

(10) Patent No.: US 8,886,624 B2
(45) Date of Patent: Nov. 11, 2014

(54) SEARCHING METHOD USING EXTENDED KEYWORD POOL AND SYSTEM THEREOF

(75) Inventors: Hyun Ho Kim, Seongnam-si (KR); Bo Ra Yoon, Seongnam-si (KR)

(73) Assignee: NHN Business Platform Corporation, Seongnam-Si (KR)

( * ) Notice: Subject to any disclaimer, the term of this patent is extended or adjusted under 35 U.S.C. 154(b) by 546 days.

(21) Appl. No.: 13/061,503

(22) PCT Filed: Aug. 28, 2009

(86) PCT No.: PCT/KR2009/004847
§ 371 (c)(1), (2), (4) Date: May 24, 2011

(87) PCT Pub. No.: WO2010/024628
PCT Pub. Date: Mar. 4, 2010

(65) Prior Publication Data
US 2011/0219015 A1    Sep. 8, 2011

(30) Foreign Application Priority Data

Aug. 28, 2008  (KR) .......................... 10-2008-0084397
Sep. 30, 2008  (KR) .......................... 10-2008-0096225
Sep. 30, 2008  (KR) .......................... 10-2008-0096226

(51) Int. Cl.
*G06F 17/30*    (2006.01)
*G06F 7/00*     (2006.01)

(52) U.S. Cl.
CPC ................................ *G06F 17/30864* (2013.01)
USPC ............ 707/706; 707/737; 707/765; 707/768

(58) Field of Classification Search
CPC ..................... G06F 17/30864; G06F 17/30672
See application file for complete search history.

(56) References Cited

U.S. PATENT DOCUMENTS 8,326,806 B1 * 12/2012 Baratloo et al. .............. 707/688
2005/0097204 A1 * 5/2005 Horowitz et al. ............. 709/223

(Continued)

FOREIGN PATENT DOCUMENTS

| KR | 1020030003739 | 1/2003 |
| KR | 1020050079845 | 8/2005 |
| KR | 1020080026948 | 3/2008 |
| WO | WO 2007/114563 | 10/2007 |

OTHER PUBLICATIONS

International Search Report for PCT/KR2009/004847 dated Apr. 1, 2010.

*Primary Examiner* — Alicia Lewis
(74) *Attorney, Agent, or Firm* — Harness, Dickey & Pierce, P.L.C.

(57) ABSTRACT

A search system using an extended keyword pool includes a processor. The processor includes a purchased keyword module configured to generate a purchased keyword set by searching for a keyword having a purchase history through a search advertisement. The processor includes an additional keyword module configured to generate an additional keyword set by extracting a keyword from at least one source. The processor includes a unified search keyword module configured to generate a unified search keyword set by searching for a keyword having a number of hits greater than a determined number of hits among queries comprising the purchased keyword set and the additional keyword set. The processor includes a search module configured to provide, as a keyword pool, an associated keyword or an extended keyword with respect to a search word, using the keywords in the purchased keyword set, the additional keyword set, and the unified search keyword set.

49 Claims, 15 Drawing Sheets

(56) References Cited

U.S. PATENT DOCUMENTS

| | | | |
|---|---|---|---|
| 2005/0267872 A1* | 12/2005 | Galai et al. | 707/3 |
| 2007/0239671 A1* | 10/2007 | Whitman et al. | 707/2 |
| 2008/0201324 A1* | 8/2008 | Aronowich et al. | 707/5 |
| 2009/0210409 A1* | 8/2009 | Levin | 707/5 |

\* cited by examiner

Fig.7

| Purpose of usage (Example) | Important point | Setting of directive |
|---|---|---|
| Keyword station | - To decrease a convexity and to increase a degree of scattering in a competition of a recommended keyword or a distribution of PPC<br>- To increase a probability of clicks after an actual registration or disclosure, to a maximum | - Whether there is a probability of sales occurrence<br>- Whether entry barriers of a registration or an execution are low<br>- Whether an adjustment of an administrator is well reflected |
| Recommended keyword service application (Associated/Automatic search word) | - To reduce a complaint from an advertiser caused by occurrence of abuse, to the minimum<br>- To reflect a use pattern of a service user, to a maximum | - Whether abusive data is excluded<br>- Whether a QQ association is well reflected<br>- Whether a filtering is well performed |
| SPM | - To maximize an association and an extension<br>- To reflect a keyword that has been extensively exposed and purchased, in an associated score | - Whether a probability of clicks after an exposure is high<br>- Whether a QQ association is well reflected<br>- Whether the exposure may result in maximum sales |

FIG. 13

| | Association indicator | definition |
|---|---|---|
| 1310 Purchase association indicator | Over○△ purchase | Overture purchased keyword association network |
| | Click×□ purchase | Click×□ purchased keyword association network |
| | Plus□△ purchase | Plus□△ purchased keyword association network |
| 1320 Advertising association indicator | Advertisement subject association | Association between a keyword extracted from an advertisement subject and |
| | Group association | Association between keywords included in the same group |
| 1330 Service data association indicator | Unified search query association | Association with a keyword that a user searches for, after searching for a predetermined keyword |
| | Unified search QC | Amount of occurrence of unified search queries including a purchased keyword |
| | Document context association | Association between keywords in documents (cafe/blog/news) |
| | Purchased keyword duplication indicator | Extent of including a purchased keyword in service data |
| 1340 Knowledge shopping association indicator | QC in knowledge shopping | Amount of occurrence of knowledge shopping queries including a purchased-keyword |
| | Knowledge shopping query association | Association with a keyword that a user searches for, after searching for a predetermined keyword |
| | Purchased keyword duplication indicator | Extent of including a purchased keyword in knowledge shopping data |

FIG. 15

| | Independent indicator | Definition |
|---|---|---|
| Common indicator | Associated score | Score calculated by an association logic |
| | Sales indicator | Period recognized sales for each keyword |
| | QC | Number of hits for each keyword |
| | Number of groups | Number of groups commonly including a representative keyword and a corresponding keyword |
| | CPC sales | Click choice sales for each keyword |
| | Number of advertisement transmissions | Number of advertisement transmission for each keyword |
| | Number of advertisement exposures | Number of advertisement exposures for each keyword |
| | Number of clicks | Number of clicks for each keyword |
| | PPC | PPC for each keyword |
| CPC indicator | Keyword CTR | CTR for each keyword |
| | Number of registered advertisements | Number of advertisements registered with a keyword |
| | Number of exposable advertisements | Number of advertisements in a state of being exposable |
| | Number of exposed advertisements | Number of actually exposed advertisements |
| | Number of clicked advertisements | Number of advertisements that may have been clicked after an exposure |
| | Number of registered advertisers | Number of advertisers who registers a corresponding keyword |
| | Number of exposable advertisers | Number of advertisers in a state of being exposable, after registering an advertisement |
| | Number of bids | Amount of bids for each keyword |
| | Invalid click proportion | Invalid click proportion for each keyword |
| CPM indicator | Cost indicator | Cost indicator for each keyword |
| | Number of bidding | Number of bidding, in case of bid keyword |
| | Rate of cost increase | Rate of cost increase in comparison with a standard cost, in case of bid keyword |

1510 — Common indicator
1520 — CPC indicator
1530 — CPM indicator

SEARCHING METHOD USING EXTENDED KEYWORD POOL AND SYSTEM THEREOF

CROSS REFERENCE TO RELATED APPLICATIONS

This application is the National Stage entry of International Application PCT/KR2009/004847, filed on Aug. 28, 2009, and claims priority from and the benefit of Korean Patent Application No. 10-2008-0084397, filed on Aug. 28, 2008, Korean Patent Application No. 10-2008-0096225, filed on Sep. 30, 2008, and Korean Patent Application No. 10-2008-0096226, filed on Sep. 30, 2008, which are all incorporated herein by reference for all purposes as if fully set forth herein.

TECHNICAL FIELD

The present invention relates to a search method using an extended keyword pool and a system for performing the method.

BACKGROUND ART

A method that may form a keyword pool corresponding to a set of keywords to be searched, and may search for keywords corresponding to a search word from the keyword pool and display a searching result when the search word is inputted is used.

In a conventional search method, a keyword set that may be used as a keyword pool may include sets of keywords having a purchase history through a search advertisement, and accordingly there may be limits to a search for more various keywords.

When the keyword pool is simply increased, there may be a problem in that even more keywords may be searched and accordingly a probability to search for the keyword that a user may desire to search may be reduced.

Thus, there is a desire for a method or system that may purpose of usage a keyword pool using various keyword sets in addition to a set of a keyword having a purchase history through a search advertisement, and may provide keywords by selecting the keywords associated with or similar to the keyword that the user may desire, from the increased keyword pool.

DISCLOSURE OF INVENTION

Technical Goals

An aspect of the present invention provides a search system using an extended keyword pool that may generate the keyword pool including sets of additional keywords, and keywords having a number of hits greater than a predetermined number for each keyword, in addition to a set of keywords having a purchase history through a search advertisement, and accordingly may provide a large range of the keywords.

An aspect of the present invention provides a search system using an extended keyword pool that may provide keywords having a high association, or a high novelty, among increased keywords by changing an associated score or a novelty score of the keyword, based on a number or a type of keyword sets where the keywords may be commonly included.

Technical Solutions

According to an aspect of the present invention, there is provided a search system using an extended keyword pool, including a purchased keyword module to generate a purchased keyword set by searching for a keyword having a purchase history through a search advertisement, an additional keyword module to generate an additional keyword set by extracting a keyword from at least one source, a unified search keyword module to generate a unified search keyword set by searching for a keyword having a number of hits greater than a predetermined number for each keyword, among queries including the purchased keyword and the additional keyword, and a search module to provide an associated keyword or an extended keyword with respect to a search word, using the keywords included in the purchased keyword set, the additional keyword set, and the unified search keyword set, as a keyword pool.

The purchased keyword module may add, to the purchased keyword set, a keyword that may show an increase in the purchase history through the search advertisement of greater than a predetermined amount, during a predetermined period.

The purchased keyword module may remove a keyword that may be designated as a sale ban keyword from the purchased keyword set.

The source from which the additional keyword module may extract a keyword may include at least one of news, blogs, Knowledge pages, shopping, site crawling, shopping mall query information, and issue keywords.

The unified search keyword module may add, to the unified search keyword set, a keyword having queries that may occur greater than a predetermined number of times during a predetermined period.

The unified search keyword module may add, to the unified search keyword set, a keyword that may be excluded from the unified search keyword set, among the keywords included in the purchased keyword set and the additional keyword set.

The search module may judge keywords excluding the keywords, included in the purchased keyword set and the additional keyword set, from the unified search keyword set, to be keywords having high novelty, and may reflect the judgment in a search result.

The search module may judge keywords that may be excluded from the unified search keyword set, among the keywords included in the purchased keyword set and the additional keyword set, to be keywords having low novelty, and may reflect the judgment in a search result.

The search module may judge that the keywords commonly included in the purchased keyword set and the additional keyword set may be highly associated with one another, and may reflect the judgment in a search result.

The search module may judge that keywords, excluding the keyword, commonly included in the purchased keyword set and the additional keyword set, from the purchased keyword set and the additional keyword set, may be less associated with one another, however, correspond to recommended keywords having a number of hits greater than a predetermined number, and may reflect the judgment in a search result.

According to an aspect of the present invention, there is also provided a search method using an extended keyword pool, including generating a purchased keyword set by searching for a keyword having a purchase history through a search advertisement, generating an additional keyword set by extracting a keyword from at least one source, generating a unified search keyword set by searching for a keyword having a number of hits greater than a predetermined number for each keyword, among queries including the purchased keyword and the additional keyword, and providing an associated keyword or an extended keyword with respect to a search word, using the keywords included in the purchased keyword set, the additional keyword set, and the unified search keyword set, as a keyword pool.

Effect

According to an aspect of the present invention, a search system using an extended keyword pool may generate the keyword pool including sets of additional keywords, and keywords having a number of hits greater than a predetermined number for each keyword, in addition to a set of keywords having a purchase history through a search advertisement, and accordingly may provide a large range of the keywords.

According to an aspect of the present invention, it is possible to provide keywords having a high association, or a high novelty, among increased keywords by changing an associated score or a novelty score of the keyword, based on a number or a type of keyword sets where the keywords may be commonly included.

BRIEF DESCRIPTION OF DRAWINGS

FIG. 7 illustrates an example of a process of setting a directive of a keyword according to another embodiment of the present invention.

FIG. 13 illustrates examples of association indicators according to another embodiment of the present invention.

FIG. 15 illustrates examples of independent indicators according to another embodiment of the present invention.

BEST MODE FOR CARRYING OUT THE INVENTION

Figure 1:
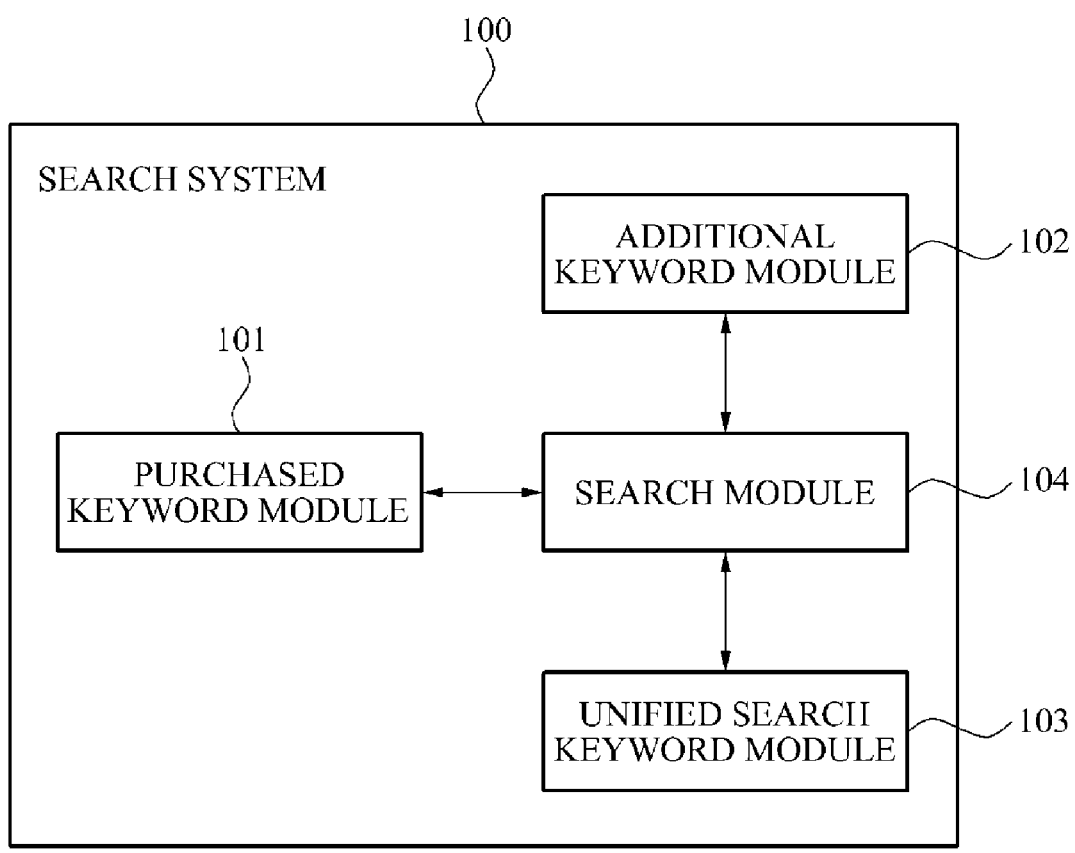
FIG. 1 illustrates a search system using an extended keyword pool according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a search system 100 using an extended keyword pool according to an embodiment of the present invention.

Referring to FIG. 1, the search system 100 using the extended keyword pool may provide, by a search module 104, an associated keyword or an extended keyword with respect to a search word using keywords included in a purchased keyword set that may be generated, in a purchased keyword module 101, by searching for a keyword having a purchase history through a search advertisement, an additional keyword set that may be generated, in an additional keyword module 102, by extracting a keyword from at least one source, and a unified search keyword set that may be generated, in a unified search keyword module 103, by searching for a keyword having a number of hits greater than a predetermined number for each keyword, among queries comprising the purchased keyword and the additional keyword, as a keyword pool.

The purchased keyword module 101 may update the purchased keyword set based on a keyword having the purchase history through the search advertisement at every predetermined period.

The purchased keyword module 101 may update the purchased keyword set by adding, to the purchased keyword set, a keyword that may show an increase in the purchase history through the search advertisement of greater than a predetermined amount, during a predetermined period, and may also update the purchased keyword set by removing, from the purchased keyword set, a keyword that may lack an increase in the purchase history through the search advertisement during a predetermined period, among keywords included in the purchased keyword set.

The purchased keyword module 101 may set a predetermined keyword to be a sale ban keyword, and may remove the keyword designated to be the sale ban keyword from the purchased keyword set when updating the keyword included in the purchased keyword set. Here, whether the purchase history through the search advertisement has increased or decreased may not be searched, however, when the setting of the sale ban keyword is cancelled, an amount of the increase of the purchase history through the search advertisement may be searched, and the purchased keyword module 101 may update the purchased keyword set by adding the removed sale ban keyword to the purchased keyword set based on the searching result.

The additional keyword module 102 may update the additional keyword set by extracting a keyword from a source including at least one of news pages, blogs, Knowledge pages, shopping, site crawling, shopping mall query information, and issue keywords, at every predetermined period.

The unified search keyword module 103 may update the unified search keyword set, based on the keyword having the number of hits greater than the predetermined number for each keyword, among the queries comprising the purchased keyword and the additional keyword, at every predetermined period.

In this instance, the unified search keyword module 103 may update the unified search keyword set by adding, to the unified search keyword set, a keyword having queries that may occur greater than a predetermined number of times during a predetermined period, and may update the unified search keyword set by removing, from the unified search keyword set, a keyword having queries that may occur fewer than a predetermined number of times during a predetermined period.

Also, the unified search keyword module 103 may update the unified search keyword set by adding, to the unified search keyword set, a keyword that may be excluded from the unified search keyword set, among the keywords included in the purchased keyword set and the additional keyword set.

The search module 104 may increase new keyword scores of keywords excluding the keywords included in the purchased keyword set and the additional keyword set, from the unified search keyword set.

Also, the search module 104 may decrease the new keyword scores of the keywords that may be excluded in the unified search keyword set, among the keywords included in the purchased keyword set and the additional keyword set.

In this instance, when the new keyword score is great, the search module 104 may judge that hits greater than a predetermined amount may occur, and that a corresponding keyword may be able to be a Business (Biz) keyword if the corresponding keyword is selected. Also, when the keyword score is low, the search module 104 may judge that the corresponding keyword may be able to be the BZ keyword if the corresponding keyword is searched.

The search module 104 may judge that the keywords commonly included in the purchased keyword set and the additional keyword set may be highly associated with one another, and accordingly may increase the associated score.

The search module 104 may decrease associated scores of keywords excluding the keywords commonly included in the purchased keyword set and the additional keyword set, from the purchased keyword set and the additional keyword set.

In this instance, the search module 104 may judge that keywords, excluding the keywords commonly included in the purchased keyword set and the additional keyword set, from the purchased keyword set and the additional keyword set, are less associated with one another, though correspond to recommended keywords having a number of hits greater than a predetermined number, and reflects the judgment in a search result.

Figure 5:
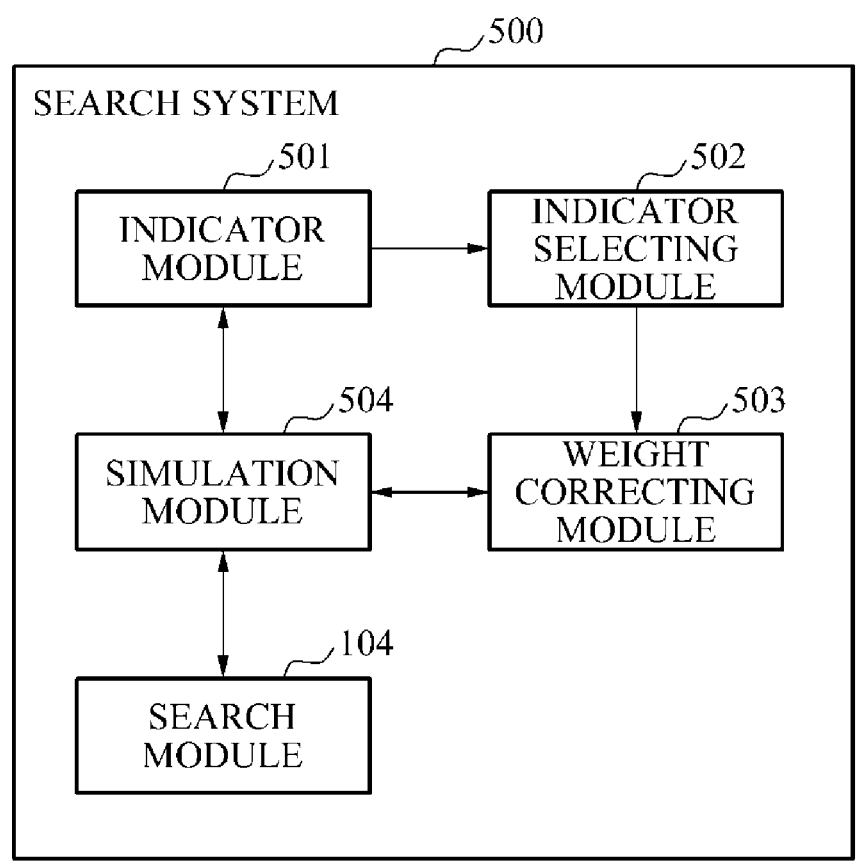
FIG. 5 illustrates a search system based on a purpose of usage according to another embodiment of the present invention.

When a purpose of usage of the keyword is assessed by an indicator module 501 of FIG. 5, an indicator selecting module 502, a weight correcting module 503, and a simulation module 504, the search module 104 may provide a keyword appropriate for the purpose of usage based on the assessment of the keyword.

An example of searching for a keyword based on the assessment of the keyword will be further described with reference to FIGS. 5 through 10.

Figure 11:
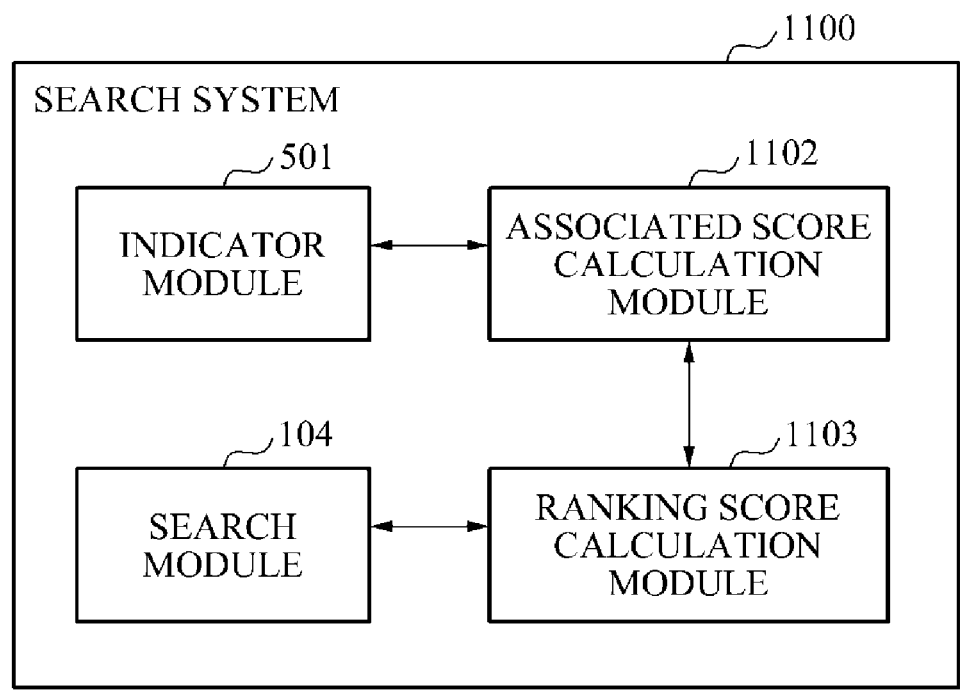
FIG. 11 illustrates a search system using an associated ranking of a keyword according to another embodiment of the present invention.

When a ranking score for each purpose of usage of the keyword is calculated by the indicator module 501, an associated score calculating module 1102 of FIG. 11, a weight correcting module 503, and a simulation module 504, the search module 104 may provide an associated keyword with respect to the search word based on the ranking score.

An example of searching for a keyword based on the ranking score will be further described with reference to FIGS. 11 through 15.

Figure 2:
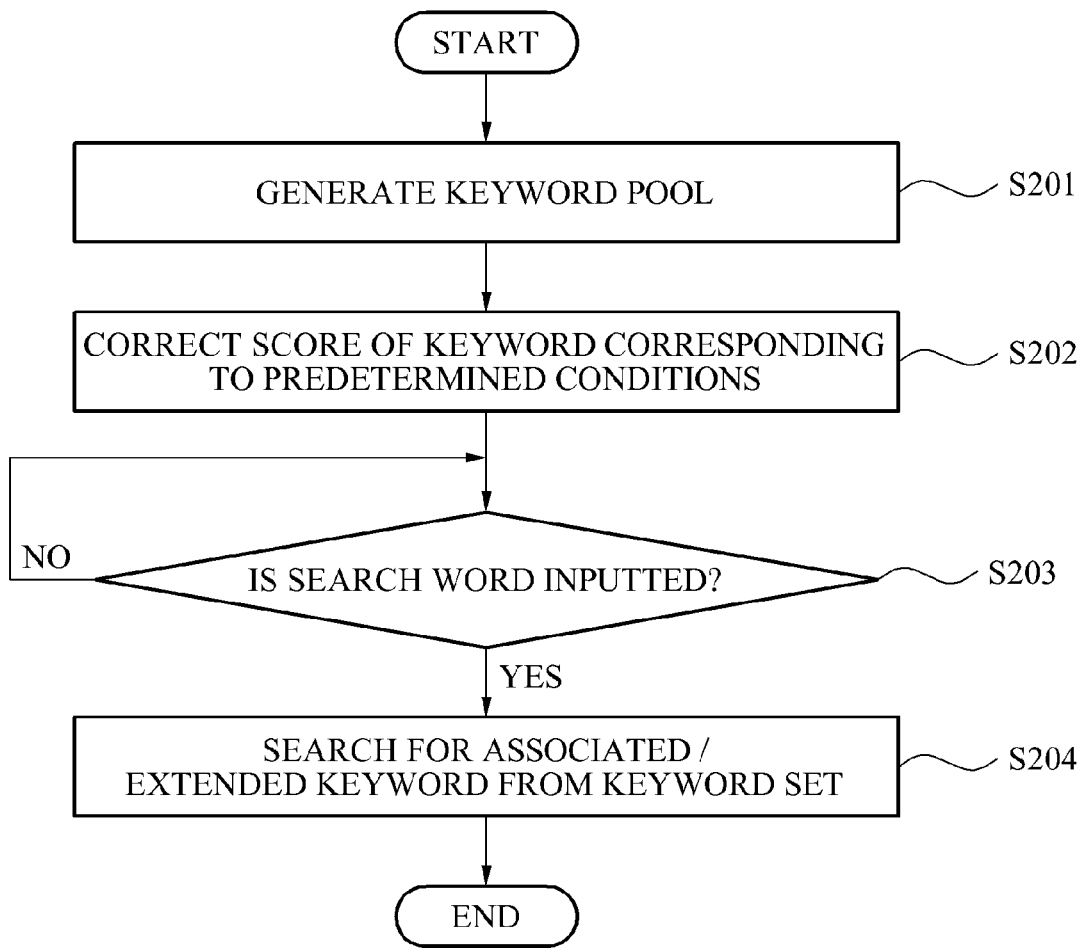
FIG. 2 illustrates a search method using an extended keyword pool according to an embodiment of the present invention.

FIG. 2 illustrates a search method using an extended keyword pool according to an embodiment of the present invention.

In operation S201, the search system 100 may generate a keyword pool corresponding to a database that may search for a keyword.

The search system 100 may generate a purchased keyword set, an additional keyword set, and a unified search keyword set respectively using the purchased keyword module 101, the additional keyword module 102, and the unified search keyword module 103, and may use keywords included in the generated keyword sets as a keyword pool.

The purchased keyword set, the additional keyword set, and the unified search keyword set may include common keywords.

Configuration of the keyword pool will be further described with reference to FIG. 3.

In operation S202, the search module 104 may correct a new keyword score or an associated score of a keyword corresponding to predetermined conditions, based on the configuration of the keyword pool generated in operation S201.

In operation S203, the search module 104 may identify whether a search word is inputted.

In operation S204, the search module 104 may search for an associated keyword or an extended keyword based on the new keyword score or the associated score of the keyword that may be stored in the keyword pool generated in operation S201, and may display a searching result.

A search method using the identified extended keyword pool will be further described with reference to FIG. 3.

Figure 3:
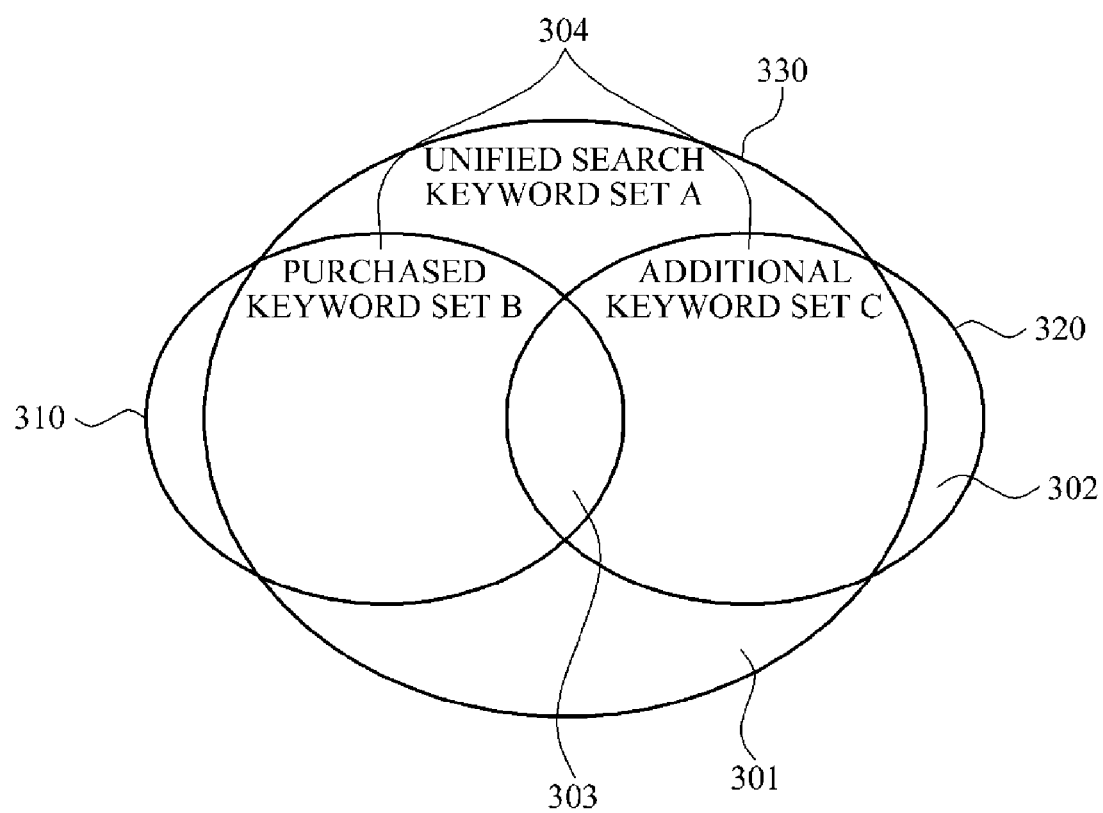
FIG. 3 illustrates an example of an extended keyword pool according to an embodiment of the present invention.

FIG. 3 illustrates an example of an extended keyword pool according to an embodiment of the present invention.

As illustrated in FIG. 3, the extended keyword pool may be generated in a state such that a purchased keyword set 310, an additional keyword set 320, and a unified search keyword set 330 may be connected.

The search module 104 may increase new keyword scores of keywords 301 from the keywords included in the unified search keyword set 330, excluding the keywords included in the purchased keyword set 310 and the additional keyword set 320.

Also, the search module 104 may decrease new keyword scores of keywords 302 included in the purchased keyword set 310 and the additional keyword set 320, that may be excluded from the unified search keyword set 330.

Here, the keywords included in the purchased keyword set 310 and the additional keyword set 320 may correspond to the union of keywords included in the purchased keyword set 310 and the keywords included in the additional keyword set 320.

The search module 104 may increase associated scores of intersection keywords 303 commonly included in the purchased keyword set 310 and the additional keyword set 320.

The search module 104 may decrease associated scores of keywords 304 excluding the intersection keywords 303 from the keywords included in the purchased keyword set 310 and the additional keyword set 320.

Figure 4:
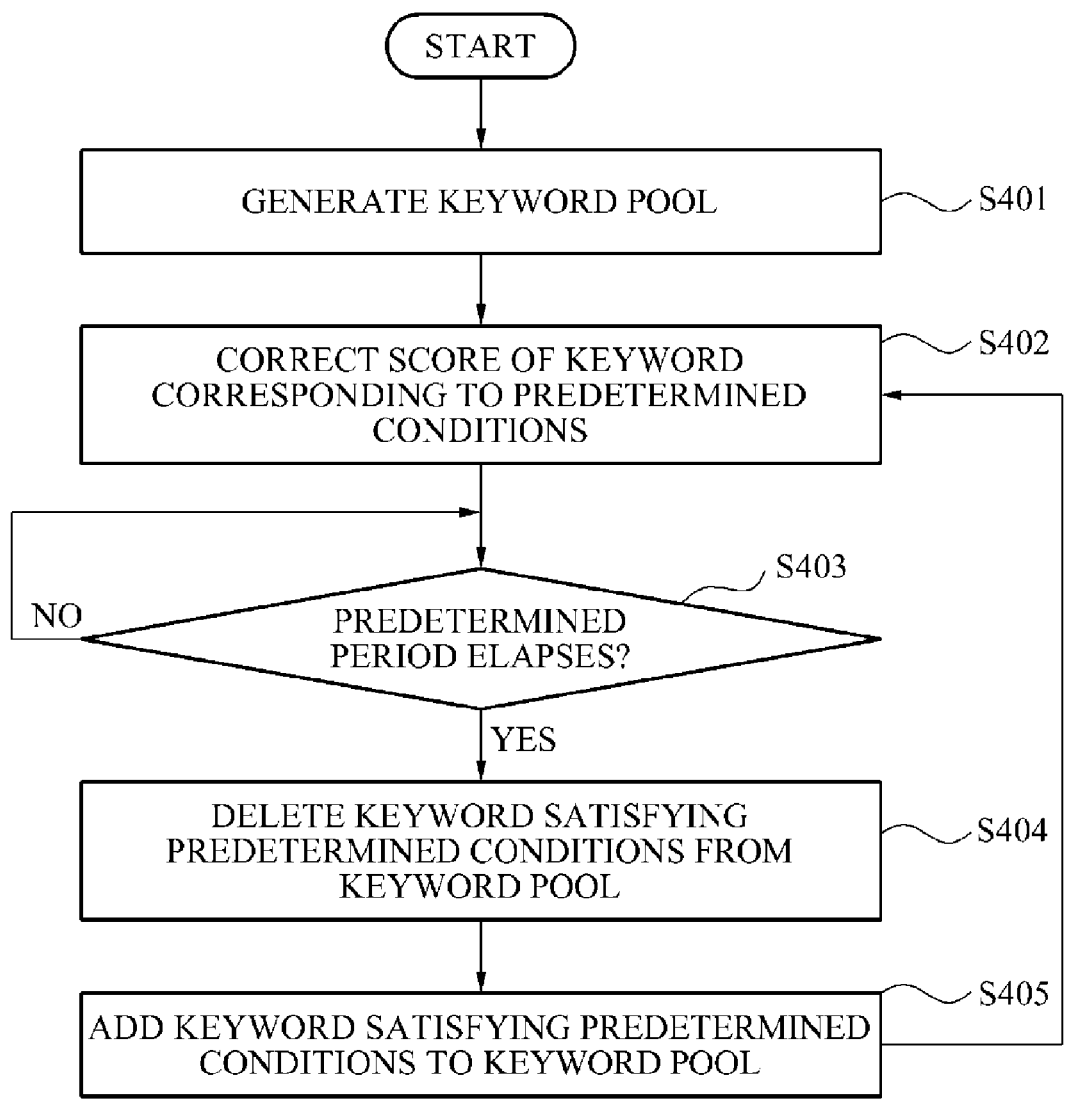
FIG. 4 illustrates a method of managing an extended keyword pool according to an embodiment of the present invention.

FIG. 4 illustrates a method of managing an extended keyword pool according to an embodiment of the present invention.

In operation S401, the search system 100 may generate a keyword pool corresponding to a database that may be used to search for a keyword.

The search system 100 may generate a purchased keyword set, an additional keyword set, and a unified search keyword set respectively using the purchased keyword module 101, the additional keyword module 102, and the unified search keyword module 103, and may use keywords included in the generated keyword sets as a keyword pool.

In operation S402, the search module 104 may correct a new keyword score or an associated score of a keyword corresponding to predetermined conditions, based on a configuration of the keyword pool generated in operation S401.

In operation S403, the search module 104 may identify whether a predetermined period has elapsed with respect to the purchased keyword module 101, the additional keyword module 102, and the unified search keyword module 103.

In operation S404, purchased keyword module 101, the additional keyword module 102, and the unified search keyword module 103 may delete, from the keyword pool, keywords that may satisfy predetermined conditions.

The purchased keyword module 101 may remove, from the keywords included in the purchased keyword set, a keyword that may lack an increase in the purchase history through the search advertisement during the predetermined period, and a keyword that may be designated as a sale ban keyword.

Also, the additional keyword module 102 may remove a keyword that an administrator may select from the additional keyword set, and the unified search keyword module 103 may remove a keyword having queries that may occur less than a predetermined amount during a predetermined period, from the keywords included in the unified search keyword set.

In operation S405, the purchased keyword module 101, the additional keyword module 102, and the unified search keyword module 103 may add keywords that may satisfy predetermined conditions to the keyword pool.

The purchased keyword module 101 may add, to the purchased keyword set, a keyword that may show an increase in a purchase history through a search advertisement of greater than a predetermined amount, and may also add a corresponding keyword when the keyword, of which setting of the sale ban keyword is cancelled, shows an increase in the purchase history through the search advertisement of greater than the predetermined amount.

The additional keyword module 102 may add, to the additional keyword set, a keyword that may be selected by extracting from at least one source. The unified search keyword module 103 may add a keyword having queries that may occur greater than a predetermined amount during a predetermined period, and a keyword that may be excluded from the unified search keyword set, among the keywords included in the purchased keyword set and the additional keyword set.

The search system using the extended keyword pool may generate the keyword pool including sets of additional keywords, and keywords having a number of hits greater than a predetermined number for each keyword, in addition to a set of keywords having a purchase history through a search advertisement, and accordingly may provide a searcher with a large range of the keywords.

Also, it is possible to provide keywords having a high association, or a high novelty, among increased keywords by changing an associated score or a novelty score of the keyword, based on a number or a type of keyword sets where the keywords may be commonly included.

FIG. 5 illustrates a search system 500 based on a purpose of usage according to another embodiment of the present invention.

Referring to FIG. 5, the search system 500 may include the indicator module 501 that may generate at least one indicator by indicating a property and an association of the keyword, the indicator selecting module 502 that may select at least one indicator from the at least one indicator as a weight indicator, in response to a purpose of usage of the keyword, the weight correcting module 503 that may change an indicator value by applying a weight to the weight indicator, and the simulation module 504 that may assess the keyword based on the weight indicator and the indicator of the keyword, and the search module 104 that may provide a keyword appropriate for a purpose of usage based on the assessment of the keyword.

The indicator module 501 may indicate the keyword included in the keyword pool formed by extending a set of the keywords of which sales may be ranked high.

The keyword may correspond to a keyword included in a set of the top ten thousand keywords in sales, where types of business may be classified, and the keyword pool may be formed by further adding, to the set of high-ranked sales keywords, a keyword that may be extracted from an additional source.

Here, the additional source may include at least one of a keyword having a number of hits greater than a predetermined number for each keyword, and news, blogs, Knowledge, shopping, site crawling, shopping mall query information, and issue keywords.

Also, the keywords included in the keyword pool may be properly indicated when the keywords are classified in response to a type of business of a keyword, and a type of business of an advertiser.

The indicator selecting module 502 may identify an important point corresponding to the purpose of usage of the keyword, may set a directive of conditions required for the purpose of usage of the keyword based on the important point, and may select at least one indicator from the at least one indicator based on the directive.

The simulation module 504 may generate a ranking logic assessment indicator for assessing the purpose of usage of the keyword, before providing the keyword, based on the weight indicator and the indicator, and may generate a quality assessment indicator for assessing an effect of the keyword to be used after providing the keyword.

The simulation module 504 may classify the indicators included in the ranking logic assessment indicator, and may correct a priority and a proportion of the keyword in response to values of the classified indicators. The ranking logic assessment indicator may include at least one of a competition indicator indicating a competition of an advertisement, a service indicator indicating a number of visits of a user, a conversion indicator indicating a Click-Through-Rate (CTR), an association indicator indicating an association; and an entry indicator indicating a level of difficulty of entry barriers.

The competition indicator may judge a low value, calculated by dividing a number of registered advertisements by a number of advertisers, to be good, and the entry indicator may judge a low pay-per-click (PPC) value to be good. Also, the service indicator may judge a high value, calculated by dividing a Query Count QC by a number of clicks, to be good, the conversion indicator may judge a high CTR value to be good, and the association indicator may judge a high associated score to be good.

Figure 6:
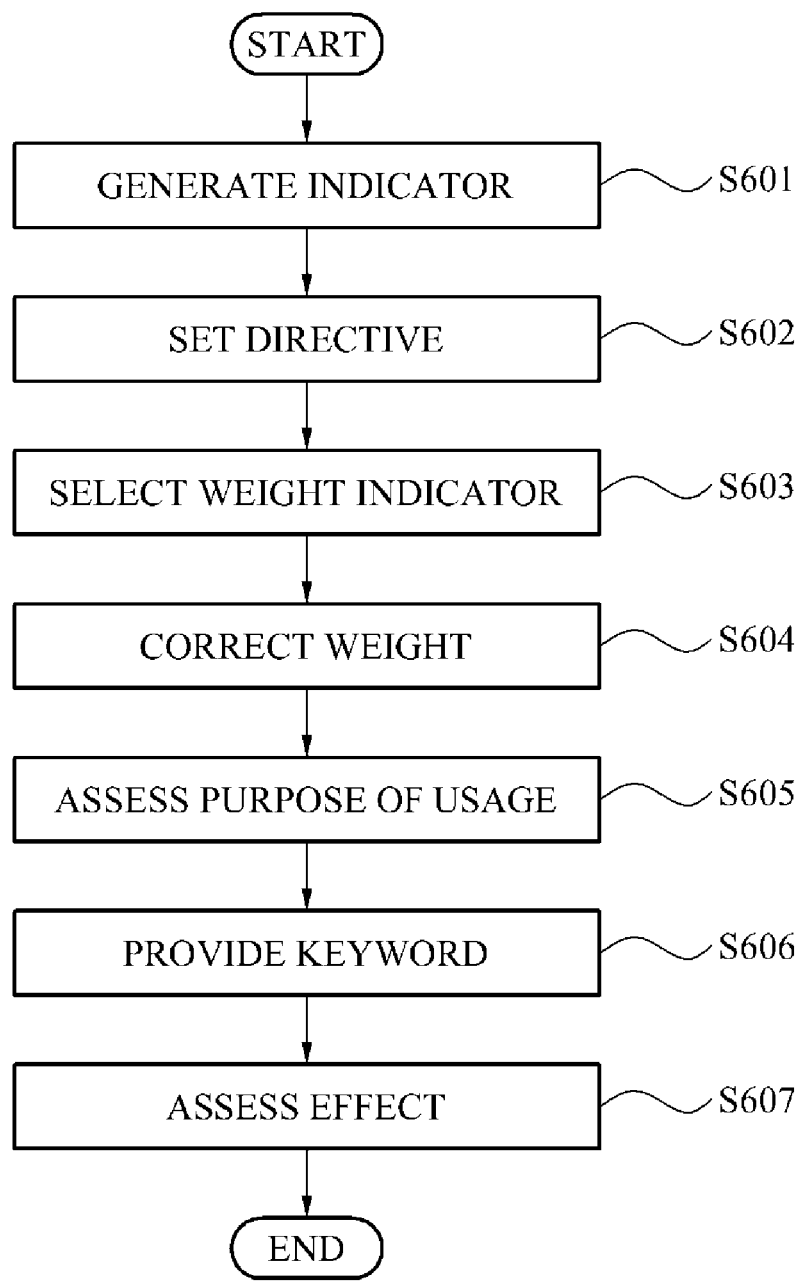
FIG. 6 illustrates a search method based on a purpose of usage according to another embodiment of the present invention.

The simulation module 504 may assess a keyword provided in operation S606 of FIG. 6, using a coverage table that may indicate whether an advertisement is actually registered using a recommended tool, and the quality assessment indicator including a sales indicator that may indicate whether the sales of the provided keyword have increased. The coverage table may include a value corresponding to a value calculated by dividing the number of the registered advertisements by a number of registered advertisers.

When values of the entry indicator and the competition indicator are low, and values of the service indicator, the conversion indicator, and the association indicator are high, the simulation module 504 may judge the keyword as a keyword required to increase degree of scattering, and may correct the priority of the keyword to be the highest level.

When values of the entry indicator and the competition indicator are high, and values of the service indicator, the conversion indicator, and the association indicator are low, the simulation module 504 may judge the keyword as a keyword required for a promotion, and may correct the priority of the keyword to be a medium level.

Also, the simulation module 504 may select a representative keyword from keywords having high values of the service indicator, the conversion indicator, and the association indicator.

FIG. 6 illustrates a search method based on a purpose of usage according to another embodiment of the present invention.

In operation S601, the indicator module 501 may generate an indicator by indicating characteristics of the keyword, and an association with other keywords.

The indicator module 501 may generate an independent indicator by indicating characteristics of the keyword, and may generate an association indicator by indicating an association between the keyword and the other keywords.

In operation S602, the indicator selecting module 502 may identify an important point corresponding to the purpose of usage of the keyword, and may set a directive of conditions required for the purpose of usage of the keyword based on the important point.

A process of setting the directive will be further described with reference to FIG. 7.

In operation S603, the indicator selecting module 502 may select at least one of the indicators generated in operation S601, based on the directive set in operation S602, in response to the purpose of usage of the keyword.

A process of selecting the indicator will be further described with reference to FIG. 8.

In operation S604, the weight correcting module 503 may make a correction by applying a weight to a value of the indicator selected in operation S603.

The weight may be differently set for each of the indicators, based on importance of the indicators in the purpose of usage of the keyword.

In operation S605, the simulation module 504 may assess the purpose of usage of the keyword based on the indicator that may not be corrected, by applying the weight indicator corrected in operation S604 and the weight generated in operation S601.

The simulation module 504 may classify indicators included in a ranking logic assessment indicator, and may correct a priority and a proportion of the keyword in response to values of the classified indicators. The ranking logic assessment indicator may include at least one of a competition indicator indicating a competition of an advertisement; a service indicator indicating a number of visits of a user; a conversion indicator indicating a Click-Through-Rate (CTR); an association indicator indicating an association; and an entry indicator indicating a level of difficulty of entry barriers.

Here, the competition indicator may judge a low value, calculated by dividing a number of registered advertisements by a number of registered advertisers, to be good, and the entry indicator may judge a low PPC value to be good. Also, the service indicator may judge a high value, calculated by dividing QC by a number of clicks, to be good, the conversion indicator may judge a high CTR value to be good, and the association indicator may judge a high associated score to be good.

The simulation module 504 may select a representative keyword from keywords having high values of the service indicator, the conversion indicator, and the association indicator.

When values of the entry indicator and the competition indicator are low, and values of the service indicator, the conversion indicator, and the association indicator are high, the simulation module 504 may judge the keyword as a keyword required to increase a degree of scattering, and may correct the priority of the keyword to be the highest level. When values of the entry indicator and the competition indicator are high, and values of the service indicator, the conversion indicator, and the association indicator are low, the simulation module 504 may judge the keyword as a keyword required for a promotion, and may correct the priority of the keyword to be a medium level.

A process of assessing the purpose of usage of the keyword will be further described with reference to FIG. 9.

In operation S606, the search module 104 may provide a keyword appropriate for the purpose of usage based on the assessment of the keyword assessed in operation S605.

In operation S607, the simulation module 504 may assess the keyword provided in operation S605.

The simulation module 504 may assess the keyword, using a coverage table that may indicate whether an advertisement is actually registered using a recommended tool, and a quality assessment indicator including a sales indicator that may indicate whether the sales of the keyword provided in operation S606 have increased. The coverage table may include a value corresponding to a value calculated by dividing the number of the registered advertisements by a number of registered advertisers.

A search method based on the identified purpose of usage will be further described with reference to examples of FIGS. 7, 8, and 9.

FIG. 7 illustrates an example of a process of setting a directive of a keyword according to another embodiment of the present invention.

Referring to FIG. 7, a process of setting directives of a keyword 711 used for a keyword station, a keyword 721 used for a recommended keyword service application, and a keyword 731 used for Sub Phrase Match (SPM).

As illustrated in FIG. 7, an important point 712 of the keyword 711 used for the keyword station may include a point that a convexity should be lower and a degree of scattering should be increased in a competition of a recommended keyword or a distribution of PPC, and a point that a probability of clicks after an actual registration or disclosure should be increased.

Here, the indicator selecting module 502 may set, for the keyword used for the keyword station 711, a setting of directive 713 including conditions of 'whether there is a probability of sales occurrence', 'whether entry barriers of a registration or an execution are low', and 'whether an adjustment of an administrator is well reflected', based on the important point 712.

An important point 722 of the keyword 721 used for the recommended keyword service application may include a point that a complaint from an advertiser caused by occurrence of abuse should be reduced to the minimum, and a point that a use pattern of a service user should be reflected to a maximum.

Here, the indicator selecting module 502 may set, for the keyword used for the recommended keyword service application 721, a setting of directive 723 including conditions of 'whether abusive data is excluded', 'whether a Query-Query (QQ) association is well reflected', and 'whether a filtering is well performed', based on the important point 722.

An important point 732 of the keyword 731 used for SPM may include a point that an association and an extension should be maximized, and a point that a keyword that has been extensively exposed and purchased should be reflected in an associated score.

Here, the indicator selection module 502 may set, for the keyword used for SPM 731, a setting of directive 733 including conditions of 'whether a probability of clicks after an exposure is high', 'whether a QQ association is well reflected', and 'whether the exposure may result in maximum sales', based on the important point 732.

Figure 8:
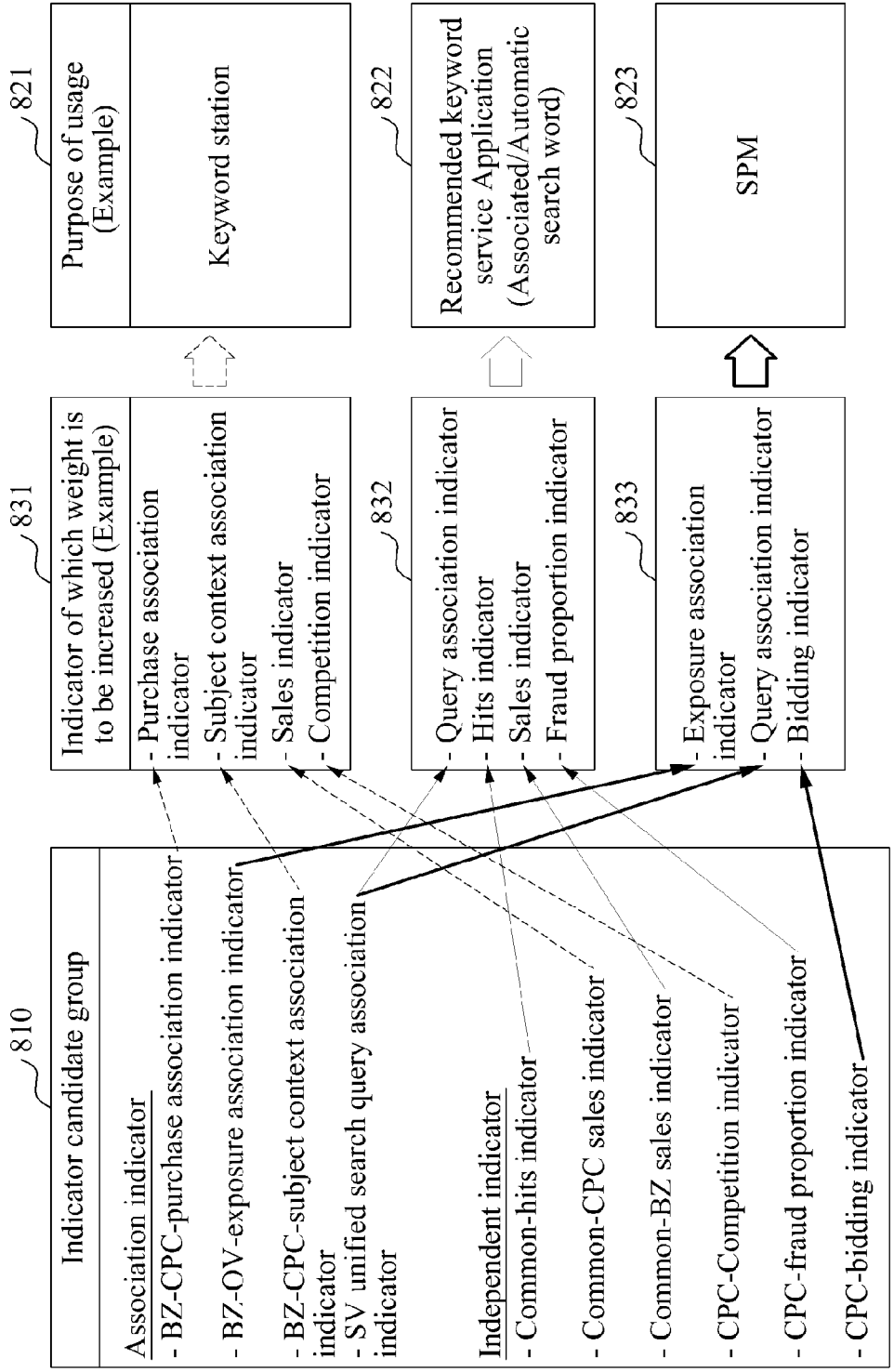
FIG. 8 illustrates an example of a process of selecting an indicator for each purpose of usage according to another embodiment of the present invention.

FIG. 8 illustrates an example of a process of selecting an indicator for each purpose of usage according to another embodiment of the present invention.

As illustrated in FIG. 8, the indicator selecting module 502 may select an indicator 831, an indicator 832, and an indicator 833 that may increase weights, from the indicators generated in operation S201, using directives with respect to a purpose of usage 821, a purpose of usage 822, and a purpose of usage 823 that may be set in operation S202.

In a case of a purpose of usage corresponding to a keyword station 821, the directive set in operation S602 may correspond to 'whether there is a probability of sales occurrence', 'whether entry barriers of a registration or an execution are low', and 'whether an adjustment of an administrator is well reflected'. Accordingly, the indicator selecting module 502 may select a competition indicator in response to 'whether entry barriers of a registration or an execution are low', a purchase association indicator and a sales indicator in response to 'whether there is a probability of sales occurrence', and a subject context association indicator in response to 'whether an adjustment of an administrator is well reflected'.

In a case of a purpose of usage corresponding to a recommended keyword service application 822, the directive set in operation S602 may correspond to 'whether abusive data is excluded', 'whether a QQ association is well reflected', and 'whether a filtering is well performed'. Accordingly, the indicator selecting module 502 may select a fraud proportion indicator in response to 'whether abusive data is excluded' and 'whether a filtering is well performed', and a query association indicator and a hits indicator in response to 'whether a QQ association is well reflected'.

In a case of a purpose of usage corresponding to SPM 823, the directive set in operation S602 may correspond to 'whether a probability of clicks after an exposure is high', 'whether a QQ association is well reflected', and 'whether the exposure may result in maximum sales'. Accordingly, the indicator selecting module 502 may select an exposure association indicator in response to 'whether a probability of clicks after an exposure is high' and 'whether the exposure may result in maximum sales', and a query association indicator in response to 'whether a QQ association is well reflected'.

Figure 9:
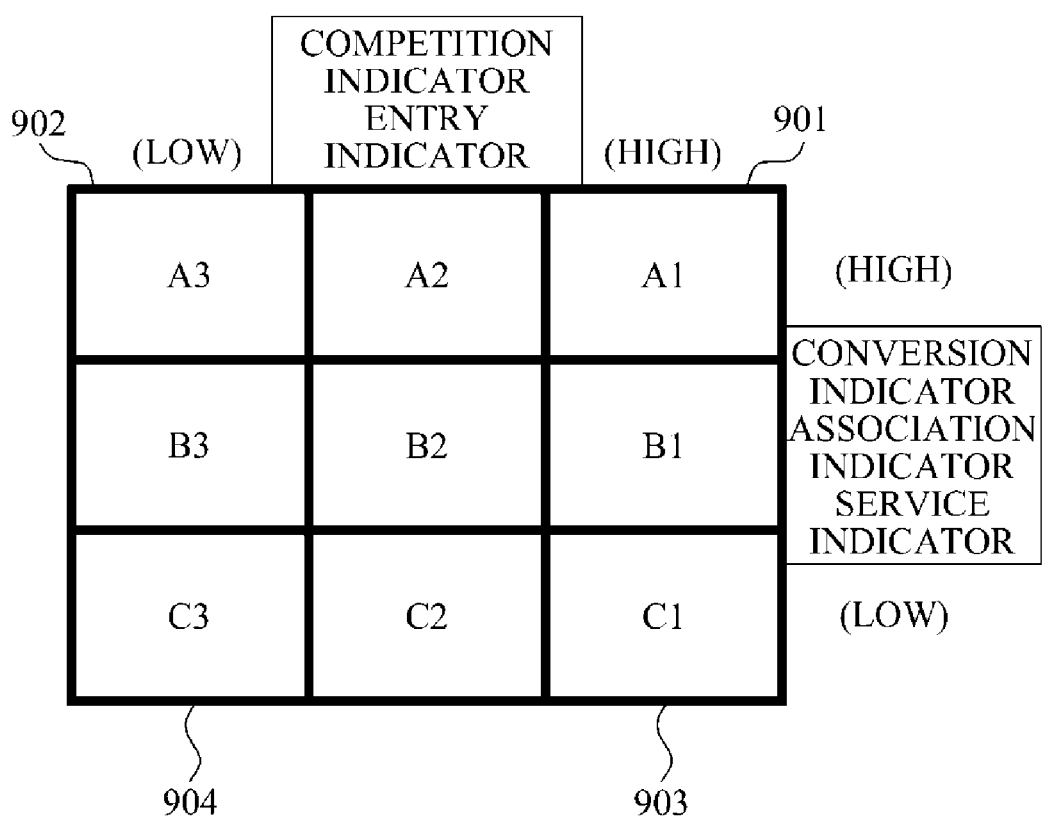
FIG. 9 illustrates an example of a process of assessing a purpose of usage of a keyword according to another embodiment of the present invention.

FIG. 9 illustrates an example of a process of assessing a purpose of usage of a keyword according to another embodiment of the present invention.

The simulation module 504 may group an entry indicator and a competition indicator in an indicator group 1, and may group a service indicator, a conversion indicator, and an association indicator in an indicator group 2. As illustrated in FIG. 9, the simulation module 504 may classify keywords into a group A1 901, a group A2, a group A3 902, a group B1, a group B2, a group B3, a group C1 903, a group C2, and a group C3 904, based on values of the indicators included in the indicator group 1, and values of the indicators included in the indicator group 2.

The competition indicator may judge a low value, calculated by dividing a number of registered advertisements by a number of advertisers, to be good, and the entry indicator may judge a low PPC value to be good. Also, the conversion indicator may judge a is high CTR value to be good, the association indicator may judge a high associated score to be good, and the service indicator may judge a high value, calculated by dividing QC by a number of clicks, to be good.

The simulation module 504 may judge, to be a keyword required to increase a degree of scattering, a keyword included in the group A3 902 including keywords, that may have low values of the indicators included in the indicator group 1, and may have high values of the indicators included in the indicator group 2, and may correct the priority of the keyword to be the first priority. The simulation module 504 may judge a keyword included in the group A1 901 including keywords, that may have high values of all of the indicators included in the indicator group 1 and the indicator group 2, to be a keyword that may have high importance, yet may be already registered, and may correct the priority of the keyword to be the second priority.

The simulation module 504 may judge, to be a keyword required for a promotion, a keyword included in the group C1 903 including keywords, that may have high values of the indicators included in the indicator group 1, and may have low values of the indicators included in the indicator group 2, and may correct the priority of the keyword to be the third priority. The simulation module 504 may judge a keyword included in the group C3 904 including keywords, that may have low values of all the indicators included in the indicator group 1 and the indicator group 2, to be a keyword that may have low importance, and may correct the priority of the keyword to be the fourth priority.

The simulation module 504 may adjust a proportion of providing keywords in response to the priority.

Figure 10:
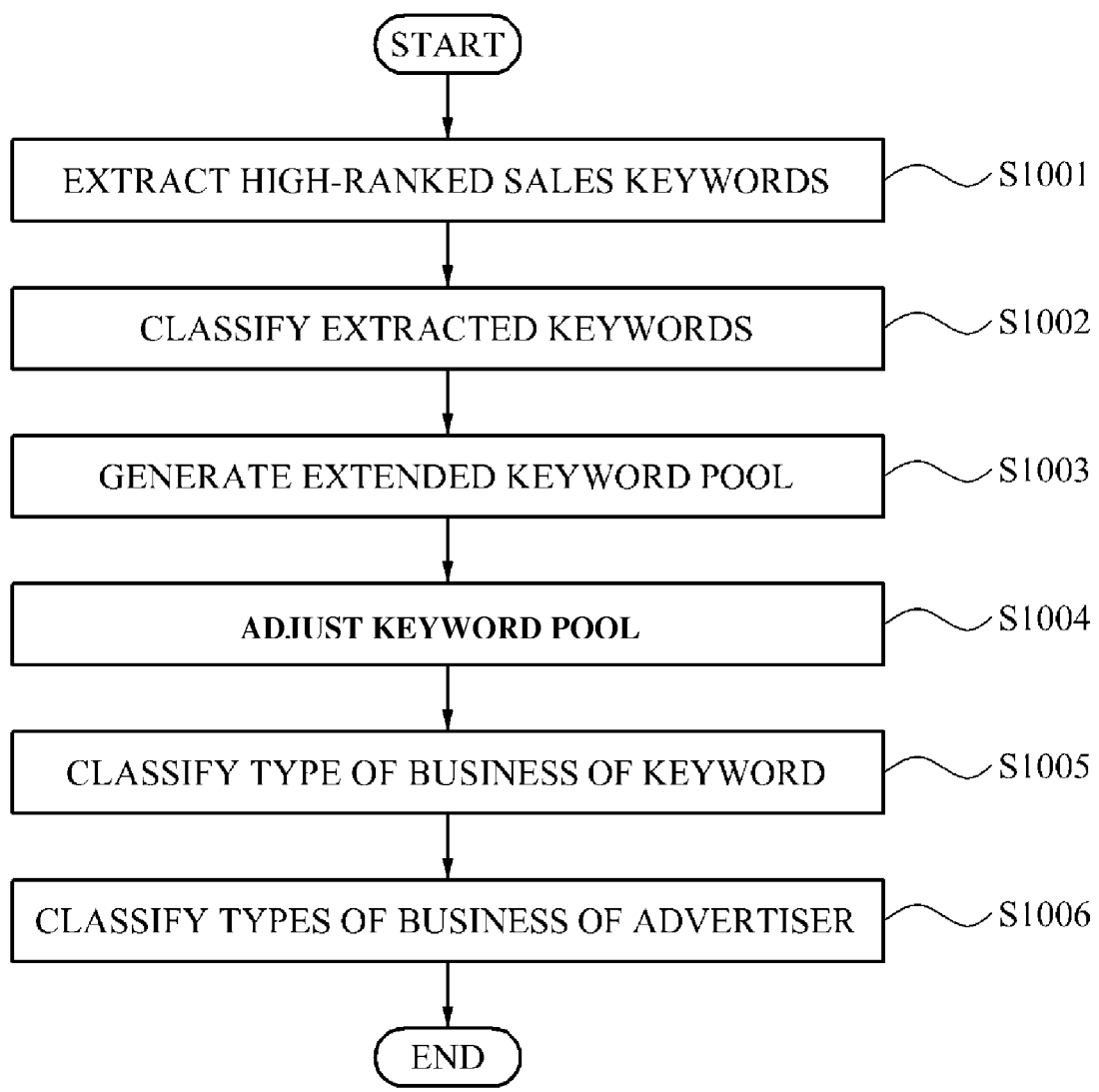
FIG. 10 illustrates a method of classifying types of business of a keyword that an indicator module may indicate according to another embodiment of the present invention.

FIG. 10 illustrates a method of classifying types of business of a keyword that an indicator module may indicate according to another embodiment of the present invention.

In operation S1001, the indicator module 501 may extract the top ten thousand keywords in sales.

In operation S1002, the indicator module 501 may classify the keywords extracted in operation S1001.

The indicator module 501 may manually classify the keywords extracted in operation S1001, for each item or for each type of business.

In operation S1003, the indicator module 501 may generate a keyword pool by extending sets of the keywords classified in operation S1001.

The indicator module 501 may generate the keyword pool further including keywords extracted from an additional source, in a set of the high-ranked sales keywords. The additional source may include at least one of a keyword having a number of hits greater than a predetermined number for each keyword, and news, blogs, Knowledge pages, shopping, site crawling, shopping mall query information, and issue keywords.

In operation S1004, the indicator module 501 may adjust the keyword pool generated in operation S1003.

The indicator module 501 may add a keyword corresponding to predetermined conditions to the keyword pool, or may remove a keyword that may fail to satisfy the predetermined conditions, from the keywords included in the keyword pool.

In operation S1004, the indicator module 501 may classify the keywords included in the keyword pool adjusted in operation S1004, for each type of business.

The indicator module 501 may generate a business type indicator for each keyword, and may group keywords of a similar type of business.

In operation S1005, the indicator module 501 may classify the keyword included is in the keyword pool adjusted in operation S1004, for each type of business of an advertiser.

The indicator module 501 may generate an advertiser business type indicator for each keyword, and, in operation S1006, may group keywords corresponding to a similar type of business of the advertiser, or the same advertiser.

The search system based on the purpose of usage may provide a keyword appropriate for a purpose of usage by assigning a weight to at least one indicator that may be appropriate for the use of the keyword, and by providing a keyword selected based on an indicator including the at least one indicator that may be assigned with the weight, and may change a priority based on values of each of the indicators, and may provide an important keyword by searching for a keyword that may have not been selected because of low values of partial indicators.

FIG. 11 illustrates a search system 1100 using an associated ranking of a keyword according to another embodiment of the present invention.

Referring to FIG. 11, in the search system 1100 using the associated ranking of the keyword, the indicator module 501 may generate an independent indicator by indicating characteristics of the keyword, and may generate an association indicator by indicating an association between the keyword and other keywords, an associated score calculation module 1102 may numerically express the association between the keyword and the other keywords based on the association indicator, as an associated score, a ranking score calculation module 1103 may calculate a ranking score for each purpose of usage based on the associated score and the independent indicator, and the search module 104 may provide the associated keyword with respect to a search word, based on the ranking score.

The association indicator may include at least one of a purchase association indicator, an advertising association indicator, a service data association indicator, an exposure association indicator, a subject context association indicator, a knowledge shopping association indicator, and a duplication indicator of each association indicator.

The independent indicator may include at least one of a common indicator, a cost per click (CPC) indicator, and a cost per mille (CPM) indicator.

The associated score calculation module 1102 may calculate a single keyword associated score by applying an individual weight to the association indicator, as expressed in Equation 1.

$$\mathrm{rel}(k_1, k_2) = \Sigma[\mathrm{Weight}_n * \mathrm{Association\ indicator}_n(k_1, k_2)] \quad \text{[Equation 1]}$$
$$= \omega_1 l_1 + \omega_2 l_2 + \omega_3 l_3 \ldots \omega_j l_j$$

The rel function may correspond to a function to calculate an associated score, k1 may indicate a keyword 1, k2 may indicate a keyword 2, w1 may indicate a weight 1, l1 may indicate an association indicator 1, and n may correspond to a value between 1 to j.

The associated score calculation module 1102 may calculate a plural keyword associated score based on the single keyword associated score calculated by the Equation 1. The plural keyword associated score may correspond to a score calculated by numerically expressing an association between sets of the keyword and the other keywords.

The associated score calculation module 1102 may calculate, as the plural keyword associated score, a value calculated by dividing a sum total of single keyword associated scores between the sets of the keyword and the other keywords by an amount of keywords included in the sets of the other keywords, as expressed in Equation 2.

$$\mathrm{rel}(k_1, k_2, \ldots, k_j), k_k) = \Sigma[\mathrm{rel}(k_m, k_k)]/n \quad \text{[Equation 2]}$$

Also, the associated score calculation module 1102 may filter keywords that may be generally used, by calculating the associated scores to be relatively low.

The associated score calculation module 1102 may judge keywords associated with keywords greater than a predetermined amount, or keywords associated with other keywords that may be unassociated with the keyword, among the keywords associated with the keyword to be the keywords that may be generally used, and may calculate the associated scores to be relatively low.

The ranking score calculation module 1103 may select a combination of indicators appropriate for the purpose of usage of the search word, from the independent indicator, and may calculate the ranking score based on the selected independent indicator and the associated score. The ranking score calculation module 1103 may calculate the ranking score by adding a sum total of values calculated by applying an individual weight to the independent indicator, and a value calculated by applying a weight corresponding to the purpose of usage to the associated score, as expressed in Equation 3.

$$\mathrm{rank}(k_k) = \Sigma[\mathrm{Weight}_n * \mathrm{Independent\ indicator}_n(k_k)] + \quad \text{[Equation 3]}$$
$$\mathrm{Weight}_z * \mathrm{rel}((k_1, k_2, \ldots, k_j), k$$
$$= \Sigma(\omega_n l_n) + \omega_z * \mathrm{rel}((k_1, k_2, \ldots, k_j), k_k)$$

The rank function may correspond to a function to calculate an associated score, and weight, may correspond to a weight for each purpose of usage.

Figure 12:
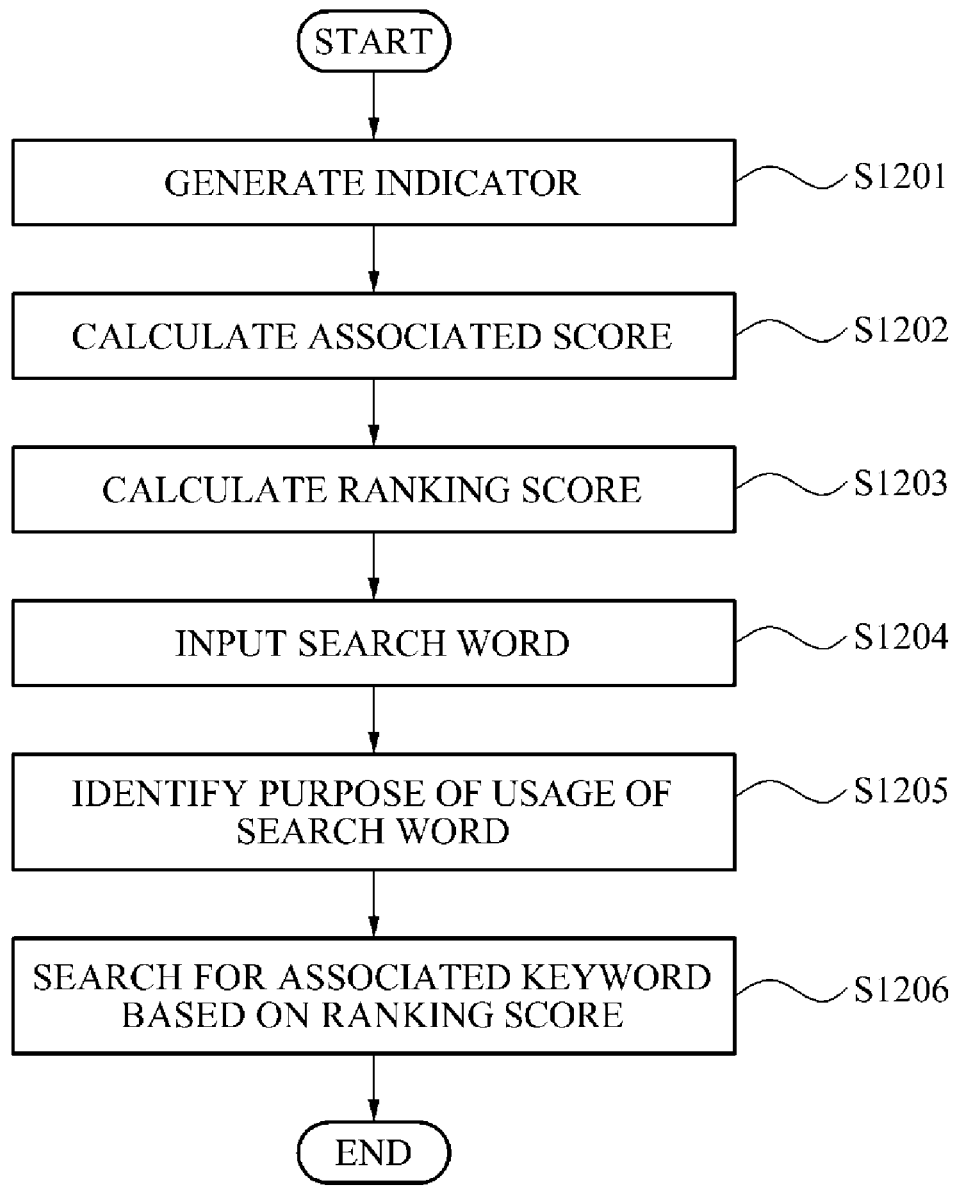
FIG. 12 illustrates a search method using an associated ranking of a keyword according to another embodiment of the present invention.

FIG. 12 illustrates a search method using an associated ranking of a keyword according to another embodiment of the present invention.

In operation S1201, the indicator module 501 may generate an indicator by indicating characteristics of the keyword and an associated with other keywords.

The indicator module 501 may generate an independent indicator by indicating characteristics of the keyword, and may generate an association indicator by indicating an association between the keyword and the other keywords.

The association indicator will be further described with reference to FIG. 13, and the independent indicator will be further described with reference to FIG. 15.

In operation S1202, the indicator selecting module 1102 may calculate an associated score that may indicate an association between the keyword and the other keywords, based on the association indicator generated in operation S1201.

The associated score calculation module 1102 may calculate a single keyword associated score by applying an individual weight to the association indicator, and may calculate a plural keyword associated score based on the calculated single keyword associated score. The associated score calculation module 1102 may calculate, as the plural keyword associated score, a value calculated by dividing a sum total of single keyword associated scores between the sets of the keyword and the other keywords by an amount of keywords included in the sets of the other keywords.

A configuration of the keywords of which the plural keyword associated score may be calculated will be further described with reference to FIG. 14.

The associated score calculation module 1102 may filter keywords that may be generally used, by calculating the associated scores to be relatively low. The associated score calculation module 1102 may judge keywords associated with keywords greater than a predetermined amount, or keywords associated with other keywords that may be unassociated with the keyword, among the keywords associated with the keyword, to be the keywords that may be generally used, and may calculate the associated scores to be relatively low.

In operation S1203, the ranking score calculation module 1103 may calculate a ranking score for each purpose of usage based on the associated score calculated in operation S1202 and the independent indicator generated in operation S1201.

The ranking score calculation module 1103 may select a combination of indicators appropriate for the purpose of usage of the search word, from the independent indicator, and may calculate the ranking score based on the selected independent indicator and the associated score. The ranking score calculation module 1103 may calculate the ranking score for each keyword, by adding a sum total of values calculated by applying an individual weight to the independent indicator, and a value calculated by applying a weight corresponding to the purpose of usage to the associated score.

In operation S1204, the search module 104 may receive an input of a search word to be searched from a user.

In operation S1205, the purpose of usage of the input search word is identified, and in operation S1206, the search module 104 may provide the associated keyword with respect to the search word, based on the ranking score calculated in operation S1203.

The search method using the associated ranking of the identified keyword will be further described with reference to examples of FIG. 13.

FIG. 13 illustrates examples of association indicators according to another embodiment of the present invention.

As illustrated in FIG. 13, the association indicators may include at least one of a purchase association indicator 1310, an advertising association indicator 1320, a service data association indicator 1330, and a knowledge shopping association indicator 1340.

The purchase association indicator 1310 may correspond to an indicator generated by indicating a purchased keyword associated network for purchasing predetermined products. As illustrated in FIG. 13, a purchase association indicator of a predetermined name may indicate a purchased keyword associated network of a predetermined name.

The advertising association indicator 1320 may correspond to an indicator generated by indicating information associated with an advertisement. As illustrated in FIG. 13, the advertising association indicator 1320 may include at least one of an advertisement subject association that may indicate an association between a keyword extracted from a subject of the advertisement, and an advertisement registered keyword, and a group association that may indicate an association between keywords included in the same group.

The service date association indicator 1330 may correspond to an indicator generated by indicating information associated with service data that may be provided from a site including the search system 1100. As illustrated in FIG. 13, the service data association indicator 1330 may include at least one of a unified search query association that may indicate an association with other keywords that the user may search again after searching for a predetermined keyword, a unified search QC that may indicate an amount of occurrence of unified search queries including a purchased keyword, a document context association that may indicate an association between keywords in documents such as a cafe, a blog and news, and a purchased keyword duplication indicator that may indicate an extent of including a purchased keyword in service data.

The knowledge shopping association indicator 1340 may correspond to an indicator generated by indicating information associated with a knowledge shopping service that may be provided from the site including the search system 1100. As illustrated in FIG. 13, the knowledge shopping association indicator 1340 may include QC in the knowledge shopping that may indicate an amount of occurrence of knowledge shopping queries including a purchased-keyword, a knowledge shopping query association that may indicate an association with other keywords that the user, who may use the knowledge shopping, may search again for after searching for a predetermined keyword, and a purchased keyword duplication indicator that may indicate an extent of including a purchased keyword in knowledge shopping data.

Figure 14:
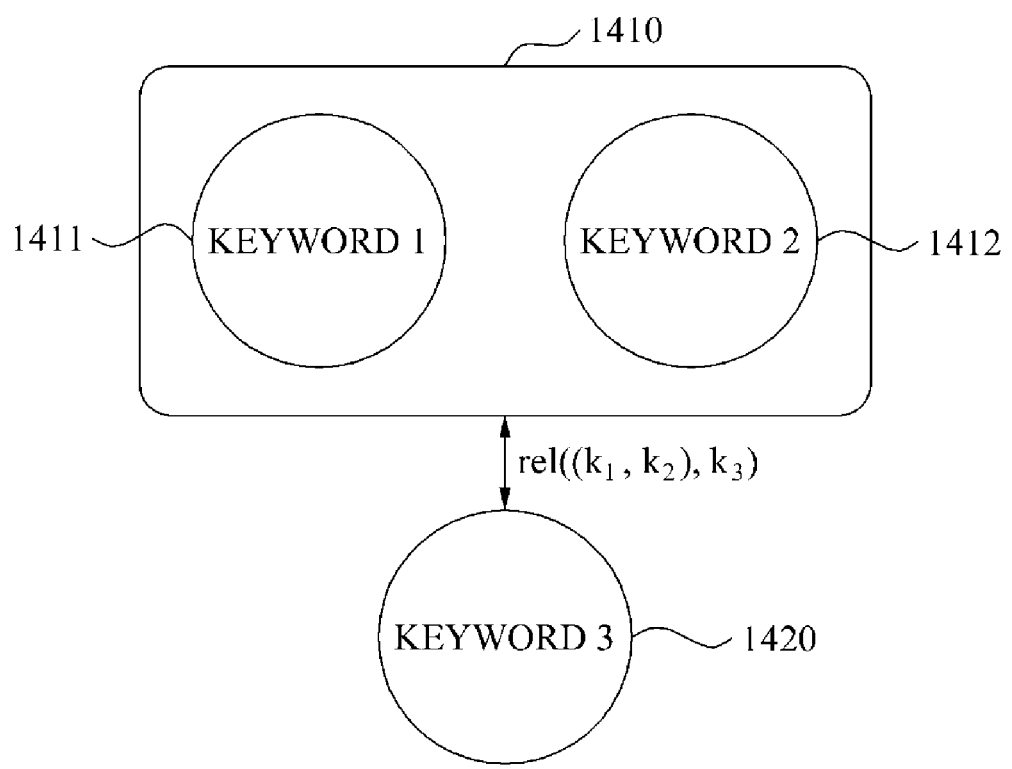
FIG. 14 illustrates examples of keywords of which a plural keyword associated score may be calculated according to another embodiment of the present invention.

FIG. 14 illustrates examples of keywords of which plural keyword associated score may be calculated according to another embodiment of the present invention.

As illustrated in FIG. 13, the associated score calculation module 1102 may calculate the plural keyword associated score by numerically expressing an association between a set 1410 of keywords including a keyword 1 1411 and a keyword 2 1412, and a keyword 3 1420.

When it is assumed that k1 may indicate the keyword 1, k2 may indicate the keyword 2, and k3 may indicate the keyword 2, the associated score calculation module 1102 may calculate an associated score of the set (k1, k2) of the keywords including the keyword 1 and the keyword 2, and k3, using Equation 4 derived from Equation 2.

$$\mathrm{rel}[(k_1,k_2),k_3]=[\mathrm{rel}(k_1,k_3)+\mathrm{rel}(k_2,k_3)]/2 \qquad \text{[Equation 4]}$$

FIG. 15 illustrates examples of independent indicators according to another embodiment of the present invention.

As illustrated in FIG. 5, the independent indicators may include at least one of a common indicator 1510, an CPC indicator 1520, and a CPM indicator 1530.

The common indicator 1310 may correspond to an indicator generated by indicating characteristics that may commonly used in a majority of keywords, among characteristics of a corresponding keyword having a generated independent indicator. As illustrated in FIG. 15, the common indicator 1510 may include a score associated with other keywords, that may be calculated by the associated score calculation module 1102, a sales indicator corresponding to period recognized sales for each keyword, and QC corresponding to a number of hits for each keyword.

The sales indicator may include at least one of a CPC sales indicator, a CPM sales indicator, a Power Link (PL) sales indicator, a Biz (BZ) sales indicator, and a Context Advertising (CA) sales indicator.

The CPC indicator 1520 may correspond to an indicator generated by indicating characteristics associated with a CPC corresponding to a cost per click. As illustrated in FIG. 15, the CPC indicator 1520 may include at least one of a number of groups commonly including a representative keyword and the corresponding keyword, CPC sales that may indicate an amount of sales for each keyword, a number of advertisement transmissions that may indicate an amount of advertisements to be transmitted in response to each keyword, a number of advertisement exposures that may indicate an amount of advertisements to be exposed in response to each keyword, a number of clicks that may indicate an amount of clicks for each keyword, PPC for each keyword, CTR for each keyword, a number of registered advertisements corresponding to a number of advertisements registered with the corresponding keyword, a number of exposure advertisements corresponding to a number of advertisements in a state of being exposable, a number of clicked advertisements corresponding to a number of advertisements that may have been clicked after an exposure, a number of registered advertisers corresponding to a number of advertisers who may register the corresponding keyword, a number of exposure advertisers corresponding to a number of advertisers who may register advertisements in a state of being exposable, a number of bids corresponding to an amount of bids for each keyword, and an invalid click proportion corresponding to a proportion that invalid clicks may occur for each keyword.

The CPM indicator 1530 may correspond to an indicator generated by indicating characteristics associated with CPM that may indicate a cost per indicator and exposure. As illustrated in FIG. 15, the CPM indicator 1530 may include at least one of a cost indicator for each keyword, a number of bidding in a case that a keyword corresponds to a bid keyword, and a rate of cost increase in comparison with a standard cost in a case that a keyword corresponds to a bid keyword.

The search system using the association ranking of the keyword may accurately compare an association between keywords by numerically expressing the association between the keywords using keyword association indicators generated by indicating the association between the keywords, and may measure an association with keyword groups, in addition to an association between keywords, by calculating an association between a keyword group including a plurality of keywords, and a predetermined keyword, based on an associated score calculated by numerically expressing an association between keywords.

Also, the search system using the association ranking of the keyword may provide a searcher with a keyword appropriate for a purpose of usage, by defining a combination of keyword indicators for each purpose of usage, and by calculating a ranking score by reflecting an independent indicator.

The above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A search system using an extended keyword pool, the system comprising:
 a processor including a purchased keyword module configured to generate a purchased keyword set by searching for a keyword having a purchase history through a search advertisement;
 the processor including an additional keyword module configured to generate an additional keyword set by extracting a keyword from at least one source;
 the processor including a unified search keyword module configured to generate a unified search keyword set by searching for a keyword having a number of hits greater than a determined number of hits during a determined period; and
 the processor including a search module configured to,
  provide an associated keyword or an extended keyword with respect to a search word, using an extended keyword pool, the extended keyword pool being generated such that the purchased keyword set, the additional keyword set, and the unified search keyword set are connected to one another,
  provide the associated keyword or the extended keyword with respect to the search word based on new keyword scores or associated scores of keywords included in the extended keyword pool,
  increase the new keyword scores of the keywords included in the unified search keyword set, excluding the keywords included in the purchased keyword set and the additional keyword set, and
  increase the associated scores of intersection keywords commonly included in the purchased keyword set and the additional keyword set.

2. The system of claim 1, wherein the purchased keyword module is configured to update the purchased keyword set by adding, to the purchased keyword set, a keyword that shows an increase in a corresponding purchase history through the search advertisement of greater than a determined amount, during a desired period, and
 the purchased keyword module is configured to update the purchased keyword set by removing, from the purchased keyword set, a keyword that does not have an increase in the corresponding purchase history through the search advertisement during the desired period.

3. The system of claim 1, wherein the additional keyword module is configured to update the additional keyword set by extracting a keyword from the at least one source at every desired period.

4. The system of claim 1, wherein the at least one source comprises at least one of news, blogs, Knowledge pages, shopping, site crawling, shopping mall query information, and issue keywords.

5. The system of claim 1, wherein at every desired period, the unified search keyword module updates the unified search keyword set based on the keyword having the number of hits greater than the determined number of hits.

6. The system of claim 5, wherein the unified search keyword module is configured to update the unified search keyword set by adding, to the unified search keyword set, the keyword having a number of queries greater than a determined number of hits during the desired period,
 the unified search keyword module is configured to update the unified search keyword set by removing, from the unified search keyword set, a keyword having a number of queries that is less than the determined number during the desired period, and
 the unified search keyword module is configured to update the unified search keyword set by adding, to the unified search keyword set, a previously excluded keyword that had been excluded from the unified search keyword set.

7. The system of claim 1, wherein the search module is configured to
 determine whether keywords from the unified search keyword set, excluding the keywords in the purchased keyword set and the additional keyword set, are keywords having high novelty, and to reflect the determination of the keywords having novelty in a search result, and determine whether keywords in the purchased keyword set and the additional keyword set that are excluded from the unified search keyword set, are keywords having low novelty, and to reflect the determination of the low novelty keywords in the search result.

8. The system of claim 1, wherein the search module is configured to determine that the keywords commonly included in the purchased keyword set and the additional keyword set are highly associated with one another, and to reflect the determination of the highly associated keywords in a search result, and the search module is configured to determine that keywords from the purchased keyword set and the additional keyword set, excluding the keywords commonly included in the purchased keyword set and the additional keyword set, have a low association with one another, yet correspond to recommended keywords having a number of hits greater than a determined number, and to reflect the determination of the low associated keywords in the search result.

9. The system of claim 1, wherein the processor further comprises:

an indicator module configured to generate at least one indicator by indicating a property and an association of the associated keyword or the extended keyword provided by the search module;

an indicator selecting module configured to select an indicator from the at least one indicator as a weight indicator, the selection is based on a purpose of usage of the associated keyword or the extended keyword;

a weight correcting module configured to apply a weight to the weight indicator in order to change an indicator value of the weight indicator; and a simulation module configured to assess the keyword based on the weight indicator and the indicator, wherein the search module is configured to provide a keyword based on the assessment of the keyword.

10. The system of claim 9, wherein the indicator selecting module is configured to identify an objective corresponding to the purpose of usage of the keyword, set a directive that includes a set of conditions for identifying the purpose of usage of the keyword based on the objective, and select a directive indicator from the at least one indicator based on the directive.

11. The system of claim 9, wherein the simulation module is configured to generate a plurality of ranking logic assessment indicators based on the weight indicator, categorize each of the ranking logic assessment indicators, and correct a priority and a proportion of the keyword in response to values of the categorized indicators.

12. The system of claim 11, wherein the plurality of ranking logic assessment indicators include at least one of a competition indicator indicating a competitiveness of an advertisement, a service indicator indicating a number of visits by a user, a conversion indicator indicating a Click-Through Rate (CTR), an association indicator indicating an association, and an entry indicator indicating entry barriers, the entry barriers being a level of difficulty associated with registering a keyword.

13. The system of claim 12, wherein the simulation module is configured to select a representative keyword from keywords associated with a service indicator having a high value relative to a first desired amount, a conversion indicator having a high value relative to a second desired amount, and a association indicator having a high value relative to a third desired amount.

14. The system of claim 9, wherein the associated keyword or the extended keyword corresponds to a keyword included in the keyword pool that further comprises a keyword extracted from an additional source, in a set of high-ranked sales keywords, the additional source classifying types of business, wherein the additional source comprises at least one of a keyword having a number of hits greater than a determined number for each keyword, and news, blogs, Knowledge pages, shopping, site crawling, shopping mall query information, and issue keywords.

15. The system of claim 9, wherein the indicator module is configured to generate an independent indicator by indicating characteristics of the associated keyword or the extended keyword, and generate an association indicator by indicating an association between the associated keyword or the extended keyword and other keywords.

16. The system of claim 15, wherein the processor further comprises:

an associated score calculation module configured to numerically express, as an associated score, the association between the associated keyword or the extended keyword and the other keywords based on the association indicator; and a ranking score calculation module configured to calculate a ranking score for each purpose of usage based on the associated score and the independent indicator, wherein the search module is configured to provide, based on the ranking score, the associated keyword or the extended keyword with respect to the search word, the association indicator comprises at least one of a purchase association indicator, an advertising association indicator, a service data association indicator, an exposure association indicator, a subject context association indicator, a knowledge shopping association indicator, and a duplication indicator of each association indicator, and the independent indicator comprises a plurality of indicators including at least one of a common indicator, a cost per click (CPC) indicator, and a cost per mille (CPM) indicator.

17. The system of claim 16, wherein the associated score calculation module is configured to calculate a single keyword associated score by applying an individual weight to the association indicator.

18. The system of claim 17, wherein the associated score calculation module is configured to calculate a plural keyword associated score based on the single keyword associated score, and the plural keyword associated score corresponds to a score calculated by numerically expressing an association between the associated keyword or the extended keyword and the other keywords.

19. The system of claim 18, wherein the associated score calculation module is configured to calculate, as the plural keyword associated score, a value calculated by dividing a sum total of single keyword associated scores between the sets of the keyword and the other keywords by an amount of keywords included in the sets of the other keywords.

20. The system of claim 16, wherein the associated score calculation module is configured to calculate an associated score of a keyword associated with keywords greater than a desired amount to have a high associated score relative to the desired amount.

21. The system of claim 16, wherein the associated score calculation module is configured to calculate an associated score of a keyword that is associated with the other keywords, the other keywords being one of (i) keywords among the keywords associated with the associated keyword or the extended keyword that have a low associated score and (ii) keywords among keywords being unassociated with the associated keyword or the extended keyword.

22. The system of claim 16, wherein the ranking score calculation module is configured to
select, from among the plurality of indicators of the independent indicator, a combination of indicators for the purpose of usage of the search word, and
calculate the ranking score based on the selected combination of indicators and the associated score.

23. The system of claim 16, wherein the ranking score calculation module calculates the ranking score by adding a sum total of values calculated by applying an individual weight to the independent indicator, and a value calculated by applying a weight corresponding to the purpose of usage to the associated score.

24. A search system using an extended keyword pool, the system comprising:
a processor including a purchased keyword module configured to generate a purchased keyword set by searching for a keyword having a purchase history through a search advertisement;
the processor including an additional keyword module configured to generate an additional keyword set by extracting a keyword from at least one source;
the processor including a unified search keyword module configured to generate a unified search keyword set by searching for a keyword having a number of hits greater than a determined number of hits from among queries which comprise the purchased keyword set and the additional keyword set;
the processor including a search module configured to provide, as a keyword pool, an associated keyword or an extended keyword with respect to a search word, using the keywords in the purchased keyword set, the additional keyword set, and the unified search keyword set;
an indicator module configured to generate at least one indicator by indicating a property and an association of the associated keyword or the extended keyword provided by the search module;
the processor including an indicator selecting module configured to select an indicator from the at least one indicator as a weight indicator, the selection is based on a purpose of usage of the associated keyword or the extended keyword;
the processor including a weight correcting module configured to apply a weight to the weight indicator in order to change an indicator value of the weight indicator; and
the processor including a simulation module configured to,
assess the keyword based on the weight indicator and the indicator,
the search module is configured to provide a keyword based on the assessment of the keyword,
generate a plurality of ranking logic assessment indicators based on the weight indicator,
categorize each of the ranking logic assessment indicators, and
correct a priority and a proportion of the keyword in response to values of the categorized indicators,
the plurality of ranking logic assessment indicators include at least one of a competition indicator indicating a competitiveness of an advertisement, a service indicator indicating a number of visits by a user, a conversion indicator indicating a Click-Through Rate (CTR), an association indicator indicating an association, and an entry indicator indicating entry barriers, the entry barriers being a level of difficulty associated with registering a keyword; and
when a value of the entry indicator and the competition indicator are low relative to a first desired amount, and a value of the service indicator, the conversion indicator, and the association indicator are high relative to a second desired amount, the simulation module is configured to
determine a degree of scattering of the keyword is to be increased, the degree of scattering indicating an amount that the keyword is available in a competition of recommended keywords, and
change the priority of the keyword to be a highest level; and
when a value of the entry indicator and the competition indicator are high relative to the first desired amount, and a value of the service indicator, the conversion indicator, and the association indicator are low relative to a second desired amount, the simulation module is configured to
determine the keyword to be a keyword for a promotion, and
change the priority of the keyword to be a medium level.

25. A search method using an extended keyword pool, the method comprising:
generating a purchased keyword set by searching for a keyword having a purchase history through a search advertisement;
generating an additional keyword set by extracting a keyword from at least one source;
generating a unified search keyword set by searching for a keyword having a number of hits greater than a determined number of hits during a determined period;
providing an associated keyword or an extended keyword with respect to a search word, using the keywords included in the purchased keyword set, the additional keyword set, and the unified search keyword set, as a keyword pool;
providing the associated keyword or the extended keyword with respect to the search word based on new keyword scores or associated scores of keywords included in the extended keyword pool;
increasing the new keyword scores of the keywords included in the unified search keyword set, excluding the keywords included in the purchased keyword set and the additional keyword set; and
increasing the associated scores of intersection keywords commonly included in the purchased keyword set and the additional keyword set.

26. The method of claim 25, wherein generating the purchased keyword set comprises:
updating the purchased keyword set by adding, to the purchased keyword set, a keyword that shows an increase in the purchase history through the search advertisement of greater than a determined amount, during a desired period;
updating the purchased keyword set by removing, from the purchased keyword set, a keyword that does not show an increase in the purchase history through the search advertisement during the desired period, among keywords included in the purchased keyword set.

27. The method of claim 25, wherein generating the additional keyword set comprises updating the additional keyword set by extracting a keyword from the at least one source at every desired period.

28. The method of claim 25, wherein the at least one source comprises at least one of news, blogs, Knowledge pages, shopping, site crawling, shopping mall query information, and issue keywords.

29. The method of claim 25, wherein generating the unified search keyword set comprises updating the unified search keyword set based on the keyword having the number of hits greater than the determined number for each keyword of hits, at every desired period.

30. The method of claim 29, wherein generating the unified search keyword set comprises:
updating the unified search keyword set by adding, to the unified search keyword set, a keyword having a number of queries greater than a determined number during a desired period;
updating the unified search keyword set by removing, from the unified search keyword set, a keyword having a number of queries less than the determined number during the desired period; and
updating the unified search keyword set by adding, to the unified search keyword set, a previously excluded keyword that had been excluded from the unified search keyword set.

31. The method of claim 25, wherein providing the keyword comprises:
determining keywords from the unified search keyword set, excluding the keywords included in the purchased keyword set and the additional keyword set, to be keywords having high novelty, and reflecting the determined high novelty keywords in a search result; and
determining keywords included in the purchased keyword set and the additional keyword set that are excluded from the unified search keyword set, to be keywords having low novelty, and reflecting the determined low novelty keywords in the search result.

32. The method of claim 25, wherein providing the keyword comprises:
determining that keywords commonly included in the purchased keyword set and the additional keyword set as being highly associated with one another, and reflecting the determined highly associated keywords in a search result; and
determining that keywords from the purchased keyword set and the additional keyword set, excluding the keywords commonly included in the purchased keyword set and the additional keyword set, have a low association with one another, but that the low association keywords from the purchased keyword set and the additional keyword set correspond to recommended keywords having a number of hits greater than a determined number, and reflecting the determined low associated keywords in the search result.

33. The method of claim 25, further comprising:
selecting an indicator from at least one indicator as a weight indicator, the selecting being in response to a purpose of usage of the associated keyword or the extended keyword;
applying a weight to the weight indicator such that an indicator value of the weight indicator is changed; and
assessing the keyword based on the weight indicator and the indicator,
wherein providing the associated keyword or the extended keyword with respect to the search word comprises providing a keyword for the purpose of usage based on the assessment of the keyword.

34. The method of claim 33, wherein generating the at least one indicator comprises:
identifying an objective corresponding to the purpose of usage of the keyword;
setting a directive that includes a set of conditions for identifying the purpose of usage of the keyword based on the objective, and
wherein selecting an indicator from the at least one indicator as a weight indicator comprises selecting the indicator from the at least one indicator based on the directive.

35. The method of claim 33, wherein assessing the keyword comprises:
generating a plurality of ranking logic assessment indicators based on the weight indicator and the indicator;
categorizing each of the ranking logic assessment indicators; and
changing a priority and a proportion of the keyword in response to values of the categorized indicators.

36. The method of claim 35, wherein plurality of the ranking logic assessment indicators include at least one of a competition indicator indicating a competitiveness of an advertisement, a service indicator indicating a number of visits of a user, a conversion indicator indicating a Click-Through Rate (CTR), an association indicator indicating an association, and an entry indicator indicating entry barriers, the entry barriers being a level of difficulty associated with registering a keyword.

37. The method of claim 36, wherein assessing the keyword comprises selecting a representative keyword from keywords associated with a service indicator having a high value relative to a first desired amount, a conversion indicator having a high value relative to a second desired amount, and a association indicator having a high value relative to a third desired amount.

38. The method of claim 33, wherein the associated keyword or the extended keyword corresponds to a keyword included in the keyword pool that further comprises a keyword extracted from an additional source, in a set of high-ranked sales keywords, the additional source classifying types of business,
wherein the additional source comprises at least one of a keyword having a number of hits greater than a determined number for each keyword, and news, blogs, Knowledge pages, shopping, site crawling, shopping mall query information, and issue keywords.

39. The method of claim 33, wherein generating the indicator comprises:
generating an independent indicator by indicating characteristics of the associated keyword or the extended keyword; and
generating an association indicator by indicating an association between the associated keyword or the extended keyword and other keywords.

40. The method of claim 39, further comprising:
numerically expressing, as an associated score, the association between the associated keyword or the extended keyword and the other keywords based on the association indicator; and
calculating a ranking score for each purpose of usage based on the associated score and the independent indicator,
wherein providing the associated keyword or the extended keyword with respect to the keyword comprises providing the associated keyword or the extended keyword with respect to the search word, based on the ranking score, the association indicator comprises at least one of a purchase association indicator, an advertising association indicator, a service data association indicator, an exposure association indicator, a subject context association indicator, a knowledge shopping association indicator, and a duplication indicator of each association indicator, and the independent indicator comprises a plurality of indicators including at least one of a common indicator, a cost per click (CPC) indicator, and a cost per mille (CPM) indicator.

41. The method of claim 40, wherein numerically expressing the association as the associated score comprises calculating a single associated score by applying an individual weight to the association indicator.

42. The method of claim 41, wherein numerically expressing the association as the associated score comprises calculating a plural keyword associated score based on the single keyword associated score, and the plural keyword associated score corresponds to a score calculated by numerically expressing an association between the associated keyword or the extended keyword and the other keywords.

43. The method of claim 42, wherein numerically expressing the association as the associated score comprises calculating, as the plural keyword associated score, a value calculated by dividing a sum total of single keyword associated scores between the sets of the keyword and the other keywords by an amount of keywords included in the sets of the other keywords.

44. The method of claim 40, wherein numerically expressing the association as the associated score comprises calculating an associated score of a keyword associated with keywords greater than a determined amount as having a high associated score.

45. The method of claim 40, wherein numerically expressing the association as the associated score comprises calculating an associated score of a keyword that is associated with the other keywords, the other keywords being one of (i) keywords among the keywords associated with the associated keyword or the extended keyword that have a low associated score and (ii) keywords among keywords being unassociated with the associated keyword or the extended keyword.

46. The method of claim 40, wherein calculating the ranking score comprises:
selecting, from among the plurality of indicators of the independent indicator, a combination of indicators for a purpose of usage of the search word; and
calculating the ranking score based on the selected combination of indicators and the associated score.

47. The method of claim 40, wherein calculating the ranking score comprises:
determining values associated with the independent indicator by applying an individual weight to the independent indicator;
determining a value associated with the associated score by applying a weight corresponding to the purpose of usage to the associated score; and
determining a sum total of the values associated with the independent indicator and the value associated with the associated score.

48. A search method using an extended keyword pool, the method comprising:
generating a purchased keyword set by searching for a keyword having a purchase history through a search advertisement;
generating an additional keyword set by extracting a keyword from at least one source;
generating a unified search keyword set by searching for a keyword having a number of hits greater than a determined number of hits from among queries which comprise the purchased keyword and the additional keyword; and
providing an associated keyword or an extended keyword with respect to a search word, using the keywords included in the purchased keyword set, the additional keyword set, and the unified search keyword set, as a keyword pool;
generating at least one indicator by indicating a property and an association of the associated keyword or the extended keyword provided with respect to the search word;
selecting an indicator from the at least one indicator as a weight indicator, the selecting being in response to a purpose of usage of the associated keyword or the extended keyword;
applying a weight to the weight indicator such that an indicator value of the weight indicator is changed; and
assessing the keyword based on the weight indicator and the indicator, the providing the associated keyword or the extended keyword with respect to the search word comprises providing a keyword for the purpose of usage based on the assessment of the keyword, the assessing including,
generating a plurality of ranking logic assessment indicators based on the weight indicator and the indicator,
categorizing each of the ranking logic assessment indicators,
changing a priority and a proportion of the keyword in response to values of the categorized indicators, and
the plurality of ranking logic assessment indicators include at least one of a competition indicator indicating a competitiveness of an advertisement, a service indicator indicating a number of visits by a user, a conversion indicator indicating a Click-Through Rate (CTR), an association indicator indicating an association, and an entry indicator indicating entry barriers, the entry barriers being a level of difficulty associated with registering a keyword; and
when a value of the entry indicator and the competition indicator are low relative to a first desired amount, and a value of the service indicator, the conversion indicator, and the association indicator are high relative to a second desired amount, the assessing of the keyword comprises,
determine a degree of scattering of the keyword is to be increased, the degree of scattering indicating an amount that the keyword is available in a competition of recommended keywords, and
changing the priority of the keyword to be a highest level, and
when values of the entry indicator and the competition indicator are high relative to the first desired amount, and values of the service indicator, the conversion indicator, and the association indicator are low relative to the second desired amount, the assessing of the keyword comprises,
determining the keyword to be a keyword for a promotion, and
changing the priority of the keyword to be a medium level.

49. A non-transitory computer-readable medium comprising a program, that when executed, instructs a computer to perform the method of claim 25.

* * * * *